US009432523B1

(12) United States Patent
Anchel (10) Patent No.: US 9,432,523 B1
(45) Date of Patent: Aug. 30, 2016

(54) SYSTEM, METHOD, AND COMPUTER PROGRAM FOR RERATING CUSTOMER EVENTS IN PARALLEL WITH EXECUTING ONE OR MORE OPEN SESSIONS IN A CONSUMER TELECOMMUNICATION NETWORK

(71) Applicant: Amdocs Software Systems Limited, Dublin 3 (IE)

(72) Inventor: Yael Anchel, Tel Aviv (IL)

(73) Assignee: Amdocs Software Systems Limited, Dublin (IE)

( * ) Notice: Subject to any disclaimer, the term of this patent is extended or adjusted under 35 U.S.C. 154(b) by 171 days.

(21) Appl. No.: 14/243,823

(22) Filed: Apr. 2, 2014

Related U.S. Application Data (60) Provisional application No. 61/807,355, filed on Apr. 2, 2013.

(51) Int. Cl.
*H04M 15/00* (2006.01)
*H04M 17/00* (2006.01)

(52) U.S. Cl.
CPC .............. *H04M 15/81* (2013.01); *H04M 17/10* (2013.01)

(58) Field of Classification Search
CPC .............................. H04M 15/81; H04M 17/10
USPC ............... 455/405–409; 379/114.03, 114.17, 379/114.27, 114.28, 114.29, 121.04, 379/121.05; 705/40, 41, 44
See application file for complete search history.

(56) References Cited

U.S. PATENT DOCUMENTS

| 7,366,495 B1* | 4/2008 | Magnotta ............ H04M 15/775 379/111 |
| 2004/0102182 A1* | 5/2004 | Reith .................... H04M 15/00 455/410 |

\* cited by examiner

*Primary Examiner* — Vladimir Magloire
*Assistant Examiner* — Erica Navar
(74) *Attorney, Agent, or Firm* — Zilka-Kotab, PC (57) ABSTRACT

A system, method, and computer program product are provided for rerating customer events in parallel with executing one or more open sessions in a consumer telecommunications network. In use, accumulated events of a current billing cycle are rerated in accordance with a billing plan associated with a telecommunications subscriber. Additionally, one or more counters associated with one or more accumulators corresponding to the telecommunications subscriber are updated, in response to the rerating. In addition, one or more open sessions associated with the telecommunications subscriber are identified. Furthermore, at least one existing reservation associated with the one or more open sessions that requires modification as a result of updating the one or more counters associated with the one or more accumulators corresponding to the telecommunications subscriber is identified. Moreover, authorization for at least one updated reservation for the at least one existing reservation associated with the one or more open sessions that requires modification is automatically requested.

13 Claims, 5 Drawing Sheets

SYSTEM, METHOD, AND COMPUTER PROGRAM FOR RERATING CUSTOMER EVENTS IN PARALLEL WITH EXECUTING ONE OR MORE OPEN SESSIONS IN A CONSUMER TELECOMMUNICATION NETWORK

CLAIM OF PRIORITY

This application claims the benefit of U.S. Provisional Application No. 61/807,355, filed Apr. 2, 2013, the entire contents of which are incorporated herein by reference.

FIELD OF THE INVENTION

The present invention relates to telecommunication services, and more particularly to rerating customer plans associated with such services.

BACKGROUND

Rerating usage costs associated with mobile subscribers in a telecommunications network is one potential operation of a telecommunications charging system. For example, consumer telecommunication events that were rated improperly due to various reasons, may be selected and rated again in order to correct the charge accumulated during a first rating. In some cases, rerating may be necessary, for example, in a case where the billing plan of the consumer has been changed retroactively.

Currently, rerating systems fail to adequately handle cases where current billing sessions are active during the rerating process. There is thus a need for addressing these and/or other issues associated with the prior art.

SUMMARY

A system, method, and computer program product are provided for rerating customer events in parallel with executing one or more open sessions in a consumer telecommunications network. In use, accumulated events of a current billing cycle are rerated in accordance with a billing plan associated with a telecommunications subscriber. Additionally, one or more counters associated with one or more accumulators corresponding to the telecommunications subscriber are updated, in response to the rerating. In addition, one or more open sessions associated with the telecommunications subscriber are identified. Furthermore, at least one existing reservation associated with the one or more open sessions that requires modification as a result of updating the one or more counters associated with the one or more accumulators corresponding to the telecommunications subscriber is identified. Moreover, authorization for at least one updated reservation for the at least one existing reservation associated with the one or more open sessions that requires modification is automatically requested.

DETAILED DESCRIPTION

Figure 1:
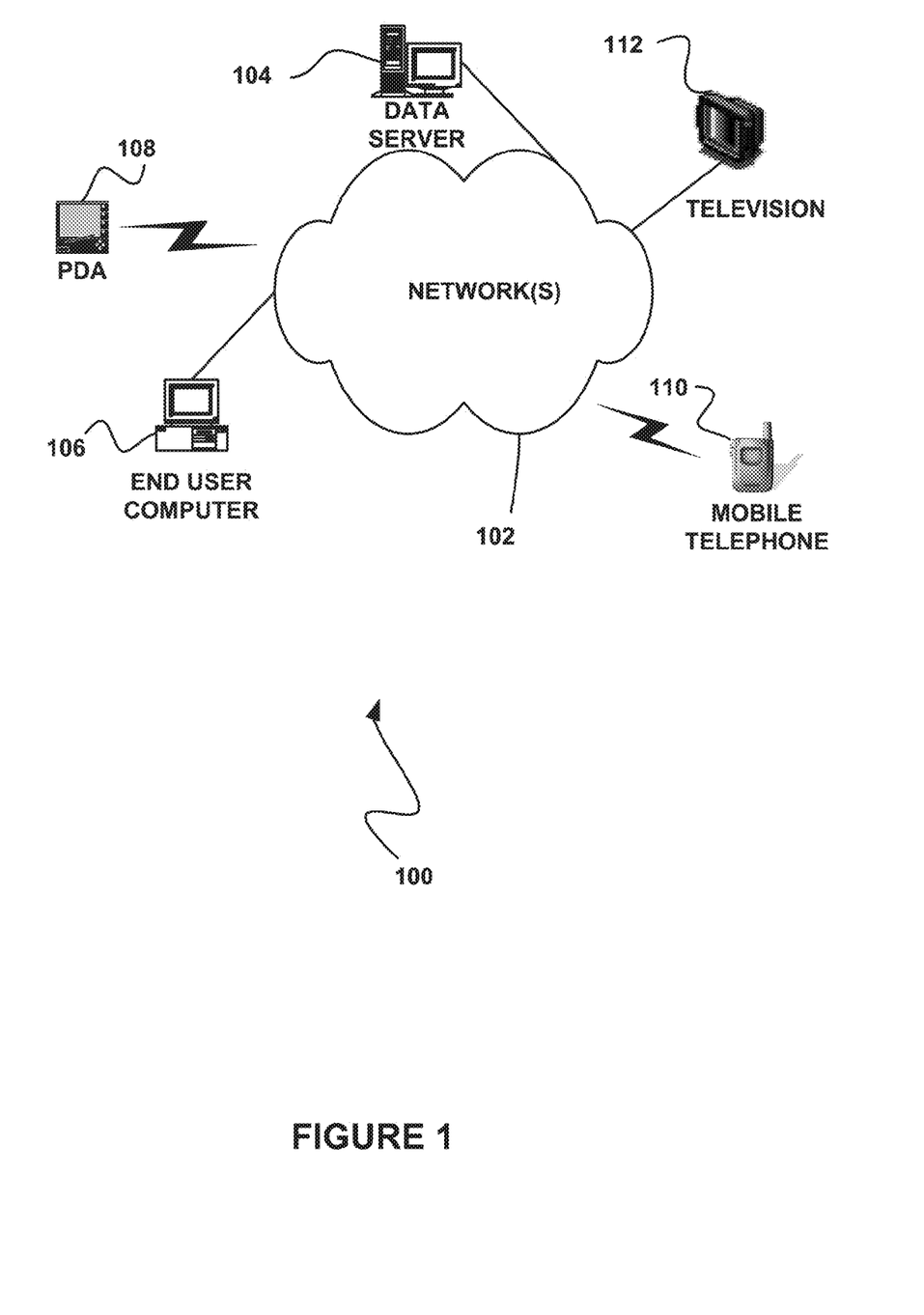
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
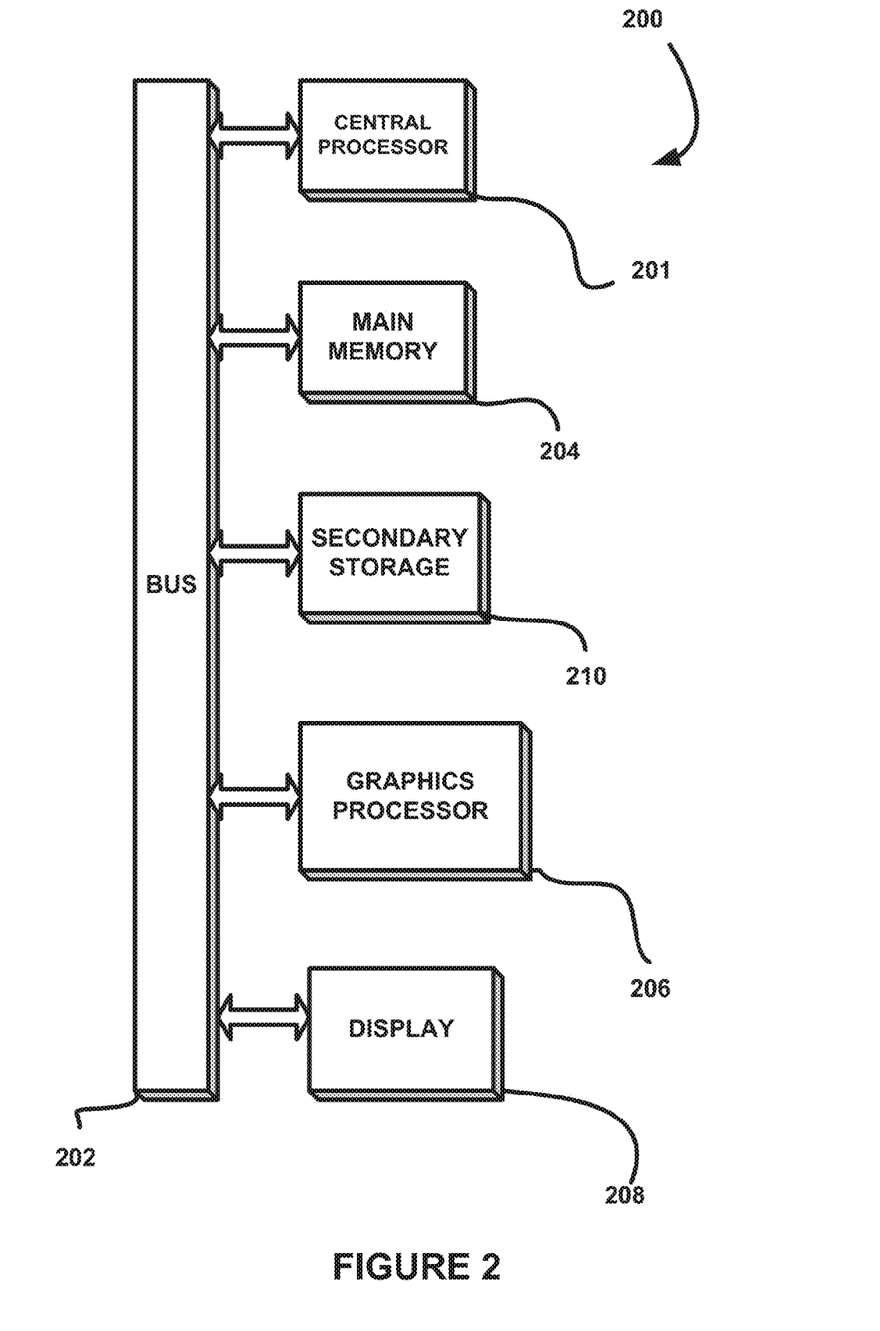
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
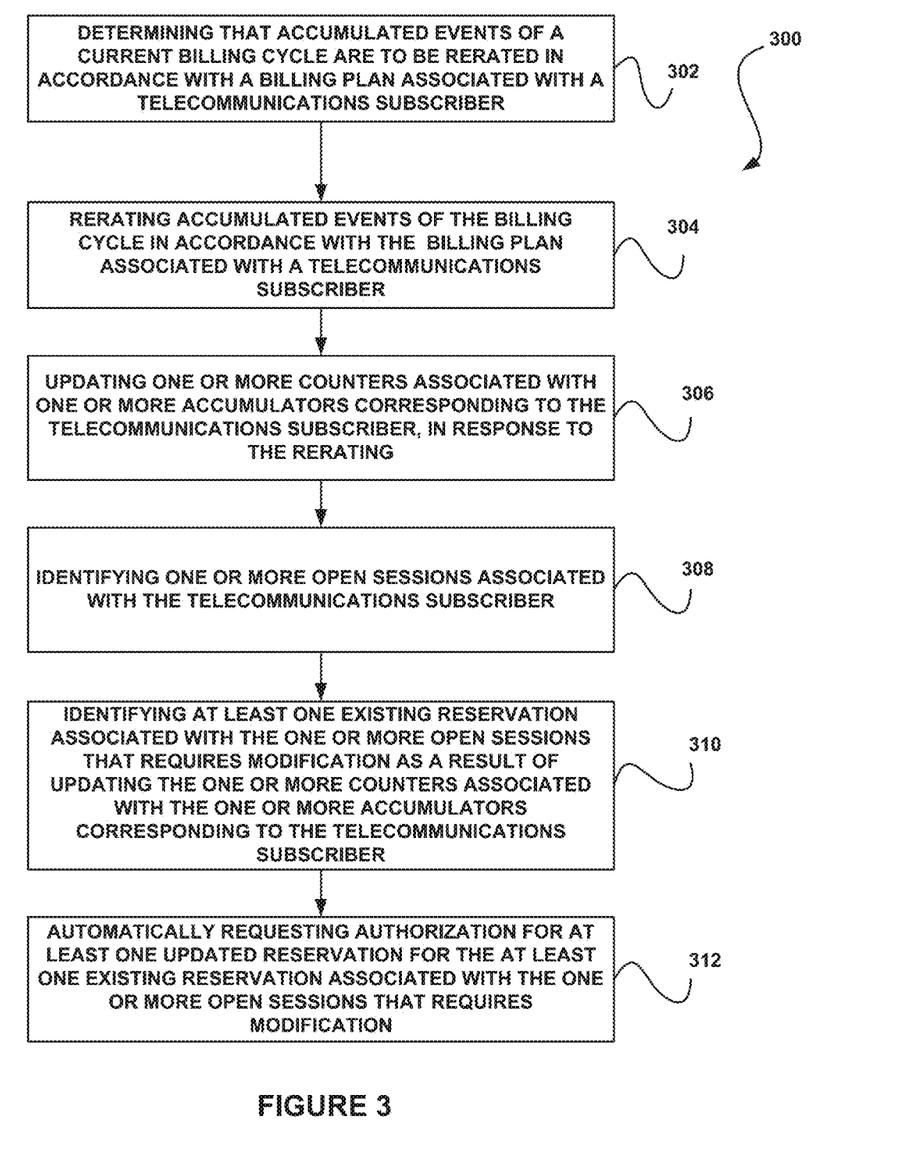
FIG. 3 illustrates a method for rerating customer events in parallel with executing one or more open sessions in a consumer telecommunications network, in accordance with one embodiment.

FIG. 3 illustrates a method 300 for rerating customer events in parallel with executing one or more open sessions in a consumer telecommunications network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, the method 300 includes determining that accumulated events of a current billing cycle are to be rerated in accordance with a billing plan associated with a telecommunications subscriber. See operation 302. The billing plan may include any type of billing plan associated with the subscriber.

For example, the billing plan may include a pre-paid billing plan. As another example, the billing plan may include a post-paid billing plan. Further, in various embodiments, the billing plan may be associated with a mobile phone plan, a data usage plan, a messaging plan (e.g. SMS and/or MMS messaging, etc.), and/or various other plans.

In the context of the present description, a telecommunications subscriber may refer to any customer of a telecommunications network service. For example, in one embodiment, the telecommunications subscriber may include a pre-paid subscriber associated with a telecommunications network. In another embodiment, the telecommunications subscriber may include a post-paid subscriber associated with a telecommunications network.

In another embodiment, the telecommunications subscriber may include a subscriber associated with a mobile phone plan. Additionally, in one embodiment, the telecommunications subscriber may include a subscriber associated with a data usage plan. In various embodiments, the subscriber may include an individual, a group of people (e.g. a family, etc.), and/or a company, etc.

In one embodiment, it may be determined to rerate accumulated events because an existing billing plan associated with the telecommunications subscriber has been modified to the modified billing plan. It may be determined that the existing billing plan associated with the telecommunications subscriber has been modified to the modified billing plan utilizing a variety of techniques. For example, in one embodiment, determining that the existing billing plan associated with the telecommunications subscriber has been modified to the modified billing plan may include determining that one or more telecommunications events associated with the telecommunications subscriber were rated incorrectly.

In various other embodiments, it may be determined to rerate accumulated events because an existing plan was wrong and operator fixed it, calls were not rated in the correct order, an offer was disconnected and therefore allowances were prorated, and/or for a variety of other reasons. Further, the rerating may include rerating in online mode in parallel to sessions and reservations.

As shown further in FIG. 3, accumulated events of a current billing cycle are rerated in accordance with the modified billing plan. See operation 304. In the context of the present descriptions, accumulated events refer to any event associated with the telecommunications service in which charges, time, and/or other data has been accumulated.

For example, in one embodiment, the accumulated event may refer to accumulated minutes resulting from mobile phone use. In another embodiment, the accumulated event may refer to accumulated data use (e.g. from Internet access, etc.). In another embodiment, the accumulated event may refer to accumulated monetary charges from calls, purchases, data use, or various other activities. Further, the billing cycle may refer to any type of billing cycle, such as a monthly billing cycle or a weekly billing cycle, etc.

In one embodiment, rerating the accumulated events of the current billing cycle in accordance with the modified billing plan may include rerating usage costs associated with the telecommunications subscriber. Furthermore, in one embodiment, rerating the accumulated events of the current billing cycle in accordance with the modified billing plan may occur in parallel with executing at least one existing reservation.

Additionally, one or more counters associated with one or more accumulators corresponding to the telecommunications subscriber are updated, in response to the rerating. See operation 306. In the context of the present description, an accumulator refers to any indicator associated with an accumulated event.

For example, in one embodiment, the one or more accumulators may be associated with an allowance. In this case, the allowance may be associated with a remaining minute allowance. As another example, the allowance may be associated with a monetary allowance.

Further, the counters may include any indicator capable of tracking accumulator values. For example, in one embodiment, the one or more counters may be associated with a number of minutes or other time. In another embodiment, the one or more counters may be associated with a monetary amount.

In addition, one or more open sessions associated with the telecommunications subscriber are identified. See operation 308. The open sessions may include any activity associated with the subscriber that is yet to be counted towards an available allowance, etc. For example, in one embodiment, the one or more open sessions may include one or more open voice sessions. In another embodiment, the one or more open sessions may include one or more open data transfer sessions.

Furthermore, at least one existing reservation associated with the one or more open sessions that requires modification as a result of updating the one or more counters associated with the one or more accumulators corresponding to the telecommunications subscriber is identified. See operation 310.

In the context of the present description a reservation refers to an amount of any type of resource needed by or allocated to the one or more open sessions. For example, in one embodiment, the reservation may include a monetary amount. In another embodiment, the reservation may include an amount associated with a time.

In one embodiment, the existing reservation may need to be updated because a counter and associated accumulator have been updated as a result of the rerating. In this case, the resources needed for an existing reservation may not be available. Of course, on the other hand there may be additional resources as a result of the rerating.

Further, in one embodiment, identifying the at least one existing reservation associated with the one or more open sessions that requires modification as a result of updating the one or more counters associated with the one or more accumulators corresponding to the telecommunications subscriber may include determining whether enough resources are still available for the at least one existing reservation. In this case, determining whether enough resources are still available for the at least one existing reservation may include determining whether at least one updated counter associated with the at least one existing reservation indicates there are enough resources still available for the at least one existing reservation.

In one embodiment, identifying the at least one existing reservation associated with the one or more open sessions that requires modification as a result of updating the one or more counters associated with the one or more accumulators corresponding to the telecommunications subscriber may include, for each open session of the telecommunications subscriber, ascertaining whether a counter of an accumulator associated with a particular open session is less than an existing reservation associated with the particular open session.

As shown further in FIG. 3, authorization for at least one updated reservation for the at least one existing reservation associated with the one or more open sessions that requires modification is automatically requested (e.g. via a reauthorization request, RAR, etc.). See operation 312. In other words, reauthorization may be requested from the network for sessions that has reservation for the counter that was changed (and it is not sufficient any more).

In one embodiment, automatically requesting authorization for the at least one updated reservation for the at least one existing reservation associated with the one or more open sessions that requires modification may include automatically requesting authorization from a provider of a telecommunications network. For example, in one embodiment, a reauthorization request may be sent to the network for the relevant session by an event server. In this case, the reauthorization event may arrive at a charging system, which may correct the previous authorization associated with the network.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
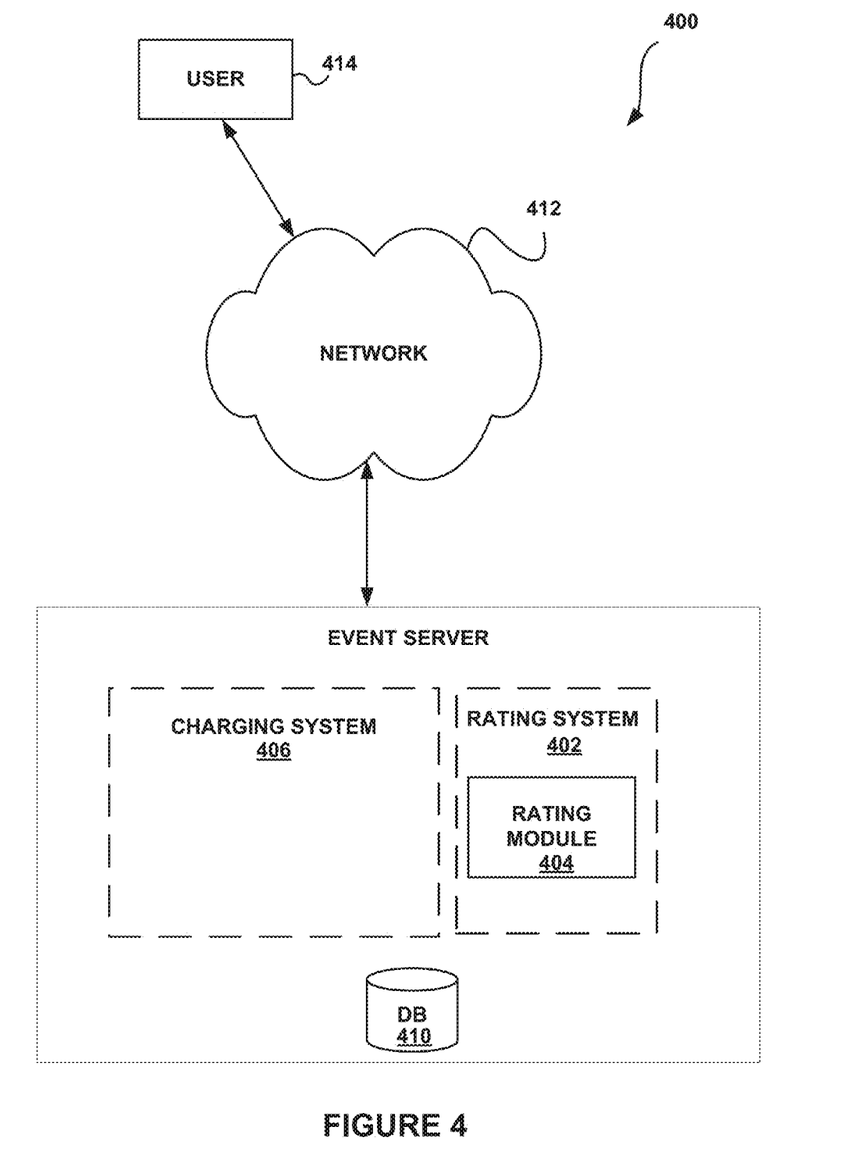
FIG. 4 illustrates a system for rerating customer events in parallel with executing one or more open sessions in a consumer telecommunications network, in accordance with one embodiment.

FIG. 4 illustrates a system 400 for rerating customer events in parallel with executing one or more open sessions in a consumer telecommunications network, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, a rating system 402 is provided. The rating system 402 may include a rating module 404 capable of rating events. In this case, the rating module 404 may include any module capable of implementing rating logic.

In one embodiment, the rating system 402 may also include a notification module. The notification module may be utilized to generate and send notifications associated with ratings and rating changes. A database 410 may also be included as a component in the rating system 402. In this case, the database 410 may represent any type of memory capable of storing data.

It should be noted that, in various embodiments, the rating system 402 may include additional components. Furthermore, the components of the rating system 402 may be configured as the same or separate modules. Still yet, the inclusion of the components and functionality described in the context of FIG. 4 may vary in different embodiments.

The system 400 may further include a charging system 406 capable of calculating charges associated with system use. In one embodiment, the rating system 402 may be in direct communication with the charging system 406 (or be a component thereof, etc.). In another embodiment, the rating system 402 may be in communication with the charging system 406 over a network 412. The network 412 may include a telecommunications network, a local area network, a wireless network, a wide area network such as the Internet, peer-to-peer network, cable network, and various other networks.

In operation, the system 400 may function to rerate customer events associated with a user 414, in parallel with executing one or more open sessions associated with the user 414. For example, the rating system 402 may function to rerate usage costs of pre-paid subscribers and post-paid subscribers having budget control plans in the consumer telecommunications environment. In operation, the rerating may be performed in parallel with the processing of ongoing communication sessions of the subscribers, where the sessions have allocated reservations.

In one embodiment, rerating usage costs of a mobile subscriber in a telecommunications network may be an operation of a telecommunications charging system, where consumer telecommunications events that were rated wrongly due to various reasons may be selected and rated again in order to correct the charge accumulated during a first rating. In some cases rerating may be necessary, for example, in a case where the billing plan of the consumer has been changed retroactively. Additionally, in one embodiment, rerating of prior events may be executed in parallel with the execution of current sessions.

For example, in one embodiment, the rerating process may be performed on a current billing cycle and may be executed in parallel with ongoing event processing, and in parallel with currently open communication sessions, which may have a reservation associated therewith. The reservation is an indicator of usable budget or other resources reserved for the associated currently open communication session.

The rerating process may therefore influence the existing reservations and authorization thereof, which may be provided to the network by the telecommunication services provider. Accordingly, as part of the rerating process, existing reservations and authorizations thereof may be updated in accordance with the counters (e.g. budget control, balance, allowances, etc.) after rerating by the rerating system 402.

Figure 5:
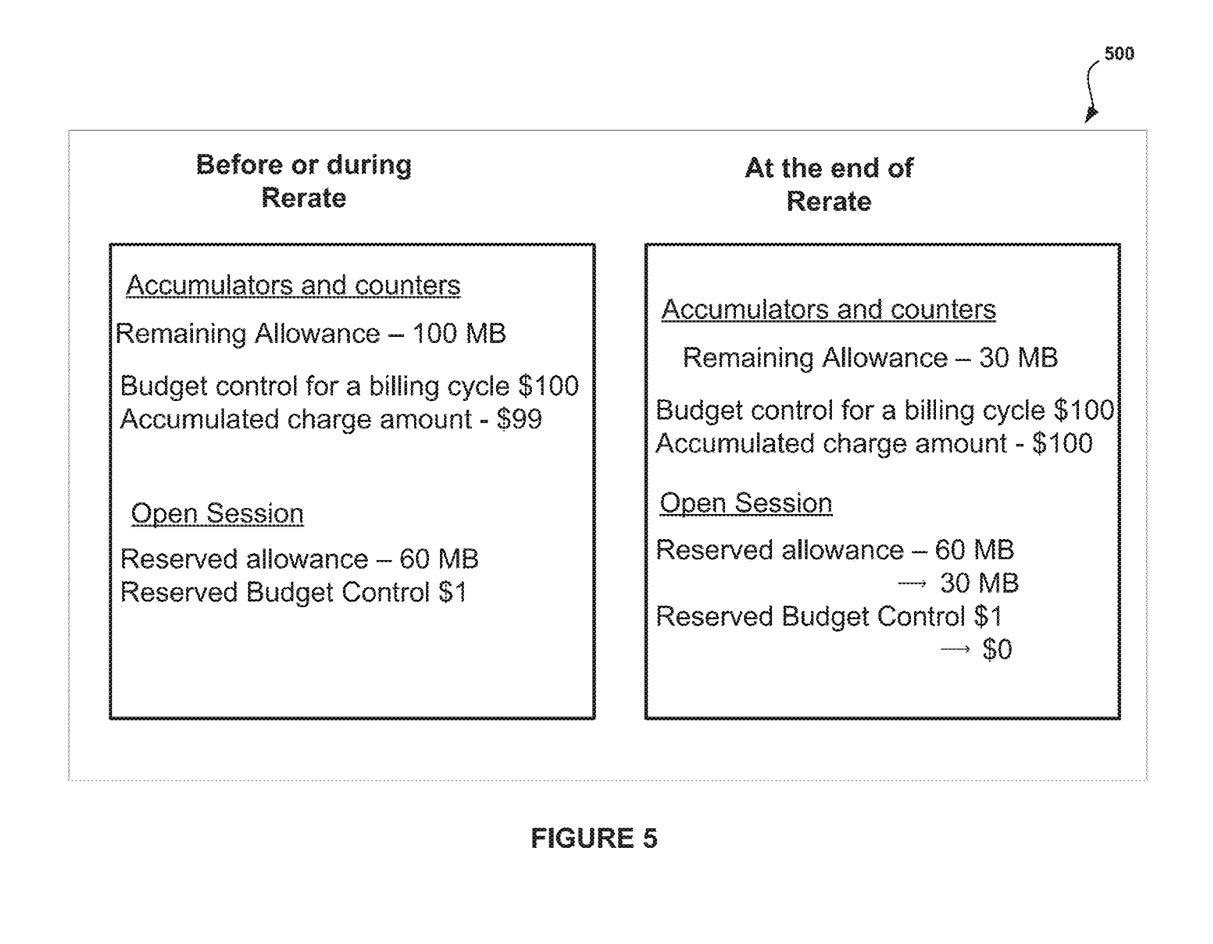
FIG. 5 illustrates a user interface showing results of rerating customer events in parallel with executing one or more open sessions in a consumer telecommunications network, in accordance with one embodiment.

FIG. 5 illustrates a user interface 500 showing results of rerating customer events in parallel with executing one or more open sessions in a consumer telecommunications network, in accordance with one embodiment. As an option, the interface 500 may be implemented in the context of the details of FIGS. 1-4. Of course, however, the interface 500 may be implemented in the context of any desired environment. Further, the aforementioned definitions may equally apply to the description below.

FIG. 5 shows a simplified illustration of a situation of a telecommunications subscriber regarding a session reservation before and after execution of a rerate process, in accordance with one example. As shown, a rerate process resulted in updating an available allowance of a subscriber from 100 available MB of data remaining in a data allowance plan, to 30 available MB. Therefore, a 60 MB reservation for a session that was previously authorized for the subscriber is no longer valid, as only a maximum of 30 MB remain in the allowance plan.

Additionally, as a result of the rerate process, the total accumulated charge for the subscriber in the current billing cycle is $100 instead of $99, which was accumulated under an older rate. Therefore, the subscriber has no remaining budget left in the budget-controlled plan. Due to these changes, an event server may request to reauthorize (or to deny authorization of) the session accordingly.

Rerating of an open billing cycle is typically executed in a dedicated thread of the event server. When initiating a rerate process, all usage accumulators and counters may be reinitialized to their condition at the beginning of the bill cycle and the events from the relevant period may be rated again.

In parallel, new events for the same subscriber/customer may arrive from the network for authorization and charging. During the current billing cycle, these events are still rated based on the old counters which existed before the start of the rerate process.

Authorization events typically perform reservations on rated resources such as allowances, balances and budget control. These reservations are associated with currently open sessions being handled by the network.

Charge events associated with a session typically release any associated reservations and are charged to the subscriber. In addition, they are kept aside in order to be added to the new copy of the accumulators, which is compiled as part of the rerate process.

When the rerate thread completes re-rating all of the outstanding events, a rerate synchronization operation may start in the ongoing rating thread. In this stage, a number of steps may be performed.

For example, a rating system may function to rate all new charge events that arrived for the subscriber/customer during the rerate process so that the associated charges will impact the new accumulators after rerate. In addition, the rating system may ascertain that the reservations on the usage accumulators, counters, and balances are still valid. In this case, the open sessions may be scanned, with each session maintaining the accumulator keys and the reservation for the counters that this accumulator maintains. Further, for each reservation counter in the session, the rating system may determine whether the relevant counter of the accumulator after rerate is greater than the reservation (meaning there are still enough resources).

If the counter after rerate is not sufficient for the existing reservation, the relevant reservation of the accumulator may be corrected for the session. Additionally, a reauthorization request may be sent to the network for the relevant session by the event server. The reauthorization event that arrives at the charging system sooner than expected may correct the previous authorization to the network.

This online rerate system enables reprocessing of events of post-paid subscribers with bill shock or budget control plans, and pre-paid subscribers with balances. The system may function to correct errors in an original rating, for example due to a wrong catalog rate.

In some cases, the rerate of such subscribers may lead to negative balance for pre-paid customers and over charging for post-paid customers having a bill shock plan. In these cases, it is a business or a legal decision whether to discount the subscriber on the overcharge or not. The rules for how to handle the overcharge/negative balance may be determined by the provider.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
computer code for determining, by a computer system, that a first billing plan associated with a telecommunications subscriber has changed to a second billing plan during a current billing cycle;
computer code, responsive to determining that the first billing plan has changed to the second billing plan, for identifying, by the computer system, accumulated events of the current billing cycle that were rated using the first billing plan;
computer code for rerating, by the computer system, the identified accumulated events using the second billing plan;
computer code for identifying, by the computer system, one or more resource allowances corresponding to the telecommunications subscriber;
computer code for updating, by the computer system, one or more counters indicating an available portion of the one or more resource allowances corresponding to the telecommunications subscriber, based on the rerating of the accumulated events;
computer code for identifying, by the computer system, one or more open sessions associated with the telecommunications subscriber being executed during the rerating and that have not yet been applied to the one or more counters;
computer code for identifying, by the computer system, at least one existing reservation allocating a portion of the one or more resource allowances to the one or more open sessions;
computer code for determining, by the computer system, that the portion of the one or more resource allowances allocated by the at least one existing reservation is more than the available portion of the one or more resource allowances indicated by the updated one or more counters, and accordingly that the at least one existing reservation requires modification as a result of updating the one or more counters associated with the one or more resource allowance; and
computer code, responsive to determining that the at least one existing reservation requires modification, for automatically requesting, by the computer system, authorization for at least one updated reservation that includes the required modification of the at least one existing reservation.

2. The computer program product of claim 1, wherein the computer program product is operable such that the one or more resource allowances include a monetary allowance.

3. The computer program product of claim 1, wherein the computer program product is operable such that the one or more resource allowances include a number of minutes.

4. The computer program product of claim 1, wherein the computer program product is operable such that the one or more open sessions include one or more open voice sessions.

5. The computer program product of claim 1, wherein the computer program product is operable such that the telecommunications subscriber includes a pre-paid subscriber to a telecommunications network.

6. The computer program product of claim 1, wherein the computer program product is operable such that the telecommunications subscriber includes a post-paid subscriber to a telecommunications network.

7. The computer program product of claim 1, wherein the computer program product is operable such that authorization for the at least one updated reservation is automatically requested from a provider of a telecommunications network.

8. The computer program product of claim 1, wherein determining that the first billing plan associated with the telecommunications subscriber has changed to the second billing plan during the current billing cycle includes determining that the accumulated events associated with the telecommunications subscriber were rated incorrectly.

9. The computer program product of claim 1, wherein the computer program product is operable such that rerating the identified accumulated events using the second billing plan includes rerating usage costs associated with the accumulated events.

10. The computer program product of claim 1, wherein the computer program product is operable such that the telecommunications subscriber includes a subscriber associated with a mobile phone plan.

11. The computer program product of claim 1, wherein the computer program product is operable such that the telecommunications subscriber includes a subscriber associated with at least one resource for reservations.

12. A method, comprising:
   determining, by a computer system, that a first billing plan associated with a telecommunications subscriber has changed to a second billing plan during a current billing cycle;
   responsive to determining that the first billing plan has changed to the second billing plan, identifying, by the computer system, accumulated events of the current billing cycle that were rated using the first billing plan;
   rerating, by the computer system, the identified accumulated events using the second billing plan;
   identifying, by the computer system, one or more resource allowances corresponding to the telecommunications subscriber;
   updating, by the computer system, one or more counters indicating an available portion of the one or more resource allowances corresponding to the telecommunications subscriber, based on the rerating of the accumulated events;
   identifying, by the computer system, one or more open sessions associated with the telecommunications subscriber being executed during the rerating and that have not yet been applied to the one or more counters;
   identifying, by the computer system, at least one existing reservation allocating a portion of the one or more resource allowances to the one or more open sessions;
   determining, by the computer system, that the portion of the one or more resource allowances allocated by the at least one existing reservation is more than the available portion of the one or more resource allowances indicated by the updated one or more counters, and accordingly that the at least one existing reservation requires modification as a result of updating the one or more counters associated with the one or more resource allowances; and
   responsive to determining that the at least one existing reservation requires modification, automatically requesting, by the computer system, authorization for at least one updated reservation that includes the required modification of the at least one existing reservation.

13. A system comprising:
   a memory of a computer system; and
   one or more processing cores of the computer system coupled to the memory system that are each configured to:
   determine that a first billing plan associated with a telecommunications subscriber has changed to a second billing plan during a current billing cycle;
   responsive to determining that the first billing plan has changed to the second billing plan, identify accumulated events of the current billing cycle that were rated using the first billing plan;
   rerate the identified accumulated events using the second billing plan;
   identify one or more resource allowances corresponding to the telecommunications subscriber;
   update one or more counters indicating an available portion of the one or more resource allowances corresponding to the telecommunications subscriber, based on the rerating of the accumulated events;
   identify one or more open sessions associated with the telecommunications subscriber being executed during the rerating and that have not yet been applied to the one or more counters;
   identify at least one existing reservation allocating a portion of the one or more resource allowances to the one or more open sessions;
   determine that the portion of the one or more resource allowances allocated by the at least one existing reservation is more than the available portion of the one or more resource allowances indicated by the updated one or more counters, and accordingly that the at least one existing reservation requires modification as a result of updating the one or more counters associated with the one or more resource allowances; and
   responsive to determining that the at least one existing reservation requires modification, automatically request authorization for at least one updated reservation that includes the required modification of the at least one existing reservation.

* * * * *